Patented Mar. 7, 1950

2,500,018

UNITED STATES PATENT OFFICE 2,500,018

METHOD OF FORMING ANHYDROUS SOLID PHASE ALKALI METAL SALTS OF GLYCO-LONITRILE

Frederick C. Bersworth, Verona, N. J.

No Drawing. Application September 20, 1946,
Serial No. 698,392

6 Claims. (Cl. 260—465.6)

This invention relates to chemistry and more particularly to organic chemistry and has for its object the provision of a method of forming anhydrous nitrile compounds conforming to the formula $MO \cdot CH_2 \cdot CN$ wherein M stands for an alkali metal.

Another object is to provide a valuable intermediate alkali metal nitrile product in the solid anhydrous phase for use in organic synthesis reactions.

Other objects will be apparent as the invention is more fully hereinafter disclosed.

I have discovered that when equal molar weights of an alkali metal cyanide, such as sodium cyanide, and anhydrous formaldehyde, such as paraformaldehyde $(CH_2O)_x$ or trioxane $(C_3H_6O_3)$ are suspended in a non-reactive inert solvent such as petroleum ether containing a relatively small amount or percentage of water functioning to produce a progressive limited solutioning of the cyanide and formaldehyde for chemical reaction, and the suspension is heated under a reflux condenser for an extended time to a refluxing temperature substantially below the decomposition temperature of the anhydrous formaldehyde and approximating 60° C., the suspended cyanide and paraformaldehyde are gradually dissolved in the water and are reacted together to form an alkali metal nitrile compound conforming to the formula $MO \cdot CH_2 \cdot CN$ wherein M stands for the alkali metal constituent of the cyanide, which nitrile is of limited solubility in the cyanide-formaldehyde water solution present and insoluble in the petroleum ether solvent present and is precipitated or crystallized out of said solutions in the form of anhydrous needle-like crystals which are recoverable by filtration from the liquid phase products associated therewith.

The recovered nitrile compound is extremely stable in a dry atmosphere for an extended time period, but is highly soluble in water wherein it undergoes hydrolysis and decomposition and reaction with a plurality of water soluble or miscible organic and inorganic compounds to form many different types and kinds of reactive products.

The nitrile compound is somewhat soluble in alcohol and hydroxylated organic solvents without hydrolysis and such solvent solutions may be employed as a medium in which to react the nitrile with a plurality of organic and inorganic compounds.

The nitrile, in the presence of activated hydrogen, also may be reacted with a large number of organic compounds to form still another series or type of compounds.

The nitrile is highly reactive with a large number of organic compounds having active or displaceable hydrogen atoms to form a large number of substitution compounds.

These chemical properties of the nitrile make the nitrile a valuable intermediate compound in organic synthesis reactions as one skilled in the art will recognize. Heretofore in the art, the existence of such a nitrile compound has been suspected but the compound, per se, has never, as yet, been isolated and all processes heretofore proposed wherein this compound is utilized as a reactant are predicated upon its theoretical and transitory existence in aqueous solutions.

As a specific embodiment of the practice of the present invention, but not as a limitation of the same, I suspend one molar weight of sodium cyanide and one molar weight of anhydrous formaldehyde (paraformaldehyde or trioxane) in about 100 cubic centimeters of petroleum ether and add thereto about .01–.05 cubic centimeter of water, preferably added in the form of 98% ethyl alcohol. This mixture is placed in a glass container closed to the atmosphere by a reflux condenser and the mixture is heated with constant stirring to the refluxing temperature of the petroleum ether (40–60° C.).

The heating and stirring is continued for a period of time approximating 1–2 hours, or until the reaction between the cyanide and the formaldehyde is completed, as may be detected by a complete disappearance of the suspended sodium cyanide and paraformaldehyde and its replacement by the needle-like crystals of the nitrile reaction product.

Various experiments have indicated that the reaction proceeds quantitatively to completion and the recoveries obtainable closely approximate 100% of the theoretical, such losses as may occur being primarily due to the mechanical losses on filtering and to such losses as may be incident to solution in the amount of water present. To avoid greater losses due to hydrolysis the heating should be terminated as soon as complete reaction is noted. Various tests using determined amounts of materials will indicate the approximate maximum time interval of heating for maximum recoveries.

In the above reaction, the amount of water employed should be held to the minimum amount required to promote the reaction by progressive solution of the sodium cyanide and paraformaldehyde for liquid phase contact reaction therebetween at the temperature of heating, within an economically practical time interval and at a relatively safe rate of reaction.

In general, temperatures greatly in excess of 60–65° C., the decomposition temperature of the paraformaldehyde, should be avoided in the practice of the present invention. Decomposition of the paraformaldehyde into gaseous formaldehyde in such amounts permitting its escape from the heated solution without reaction with the dissolved sodium cyanide introduces losses detrimentally affecting the efficiency of the process.

The chemical reaction involved in the instant invention is believed to be essentially that indicated in the following equation:

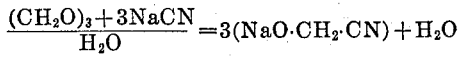

$$\frac{(CH_2O)_3 + 3NaCN}{H_2O} = 3(NaO \cdot CH_2 \cdot CN) + H_2O$$

In the practice of this invention it is advantageous to exclude air and atmospheric moisture from the reflux condenser by introducing a pressure of an inert gas such as nitrogen within the container, the pressure being sufficient to exclude the atmosphere from the container.

From the above disclosure of the present invention it is believed any one skilled in the art may duplicate the invention and all such modifications and departures from the specific embodiment given are contemplated as may fall within the scope of the following claims.

What I claim is:

1. The method of producing an anhydrous nitrile which comprises suspending an alkali metal cyanide and anhydrous formaldehyde in petroleum ether, adding a small amount of water to the suspension sufficient to dissolve only a small proportion of the cyanide and formaldehyde present in the suspension and heating the suspension with agitation under a reflux condenser to temperatures above 40° C. but not over about 70° C.

2. The method of producing an anhydrous nitrile which comprises suspending an alkali metal cyanide and anhydrous formaldehyde in petroleum ether, adding a small amount of water to the suspension sufficient to dissolve only a small proportion of the cyanide and formaldehyde present in the suspension and heating the suspension with agitation under a reflux condenser to temperatures above 40° C. but not over about 65° C., and under a positive pressure of nitrogen excluding atmospheric gases from the reflux condenser.

3. The method of producing a nitrile compound conforming to the formula NaO.CH$_2$.CN which comprises suspending equal molar weights of an alkali metal cyanide and paraformaldehyde in petroleum ether, adding a small amount of water to the suspension sufficient to dissolve only a small proportion of the cyanide and formaldehyde present in the suspension, and heating the suspension to the refluxing temperature of the petroleum ether for an extended time interval sufficient to obtain substantially complete progressive solution of the cyanide and aldehyde in the water and reaction therebetween with precipitation of the anhydrous nitrile product formed.

4. The method of producing an anhydrous nitrile conforming to the formula NaO.CH$_2$.CN which comprises suspending equal molar weights of sodium cyanide and formaldehyde each in its anhydrous state in a non-aqueous solvent having a refluxing temperature substantially below the decomposition temperature of the anhydrous formaldehyde, adding a small amount of water thereto sufficient to dissolve only a small proportion of the cyanide and formaldehyde present in the suspension, and heating the suspension with agitation to the refluxing temperature of the solvent for an extended time interval sufficient to obtain substantially complete progressive solution of the cyanide and formaldehyde in the water present and reaction of the same to the nitrile compound and its precipitation in anhydrous form in suspension in the said solvent, cooling the suspension to atmospheric temperatures and separating the precipitated nitrile from the liquid phase products associated therewith.

5. The method of claim 4 wherein said solvent consists of petroleum ether having a refluxing temperature within the range 40–60° C. and wherein the temperature of heating approximates 60° C.

6. The method of claim 4, wherein a positive pressure of an inert gas is maintained within the reflux condenser to exclude atmospheric gases from the reaction.

FREDERICK C. BERSWORTH.

REFERENCES CITED

The following references are of record in the file of this patent:

UNITED STATES PATENTS

| Number | Name | Date |
|---|---|---|
| 1,984,415 | Macallum | Dec. 18, 1934 |
| 2,101,823 | Dittmar | Dec. 7, 1937 |
| 2,387,735 | Bersworth | Oct. 30, 1945 |

FOREIGN PATENTS

| Number | Country | Date |
|---|---|---|
| 300,040 | Great Britain | Nov. 8, 1928 |
| 654,713 | Germany | Jan. 4, 1938 |

OTHER REFERENCES

Polstorff et al., Ber. Deut. Chem., vol. 45, pp. 1905–1912 (1912).